Sept. 19, 1961    H. C. ALTMANN ET AL    3,000,250
ROTARY CUTTER FOR PRODUCING A PROGRESSIVE
TRANSVERSE CUT ON A WEB
Filed Feb. 25, 1957    4 Sheets-Sheet 1
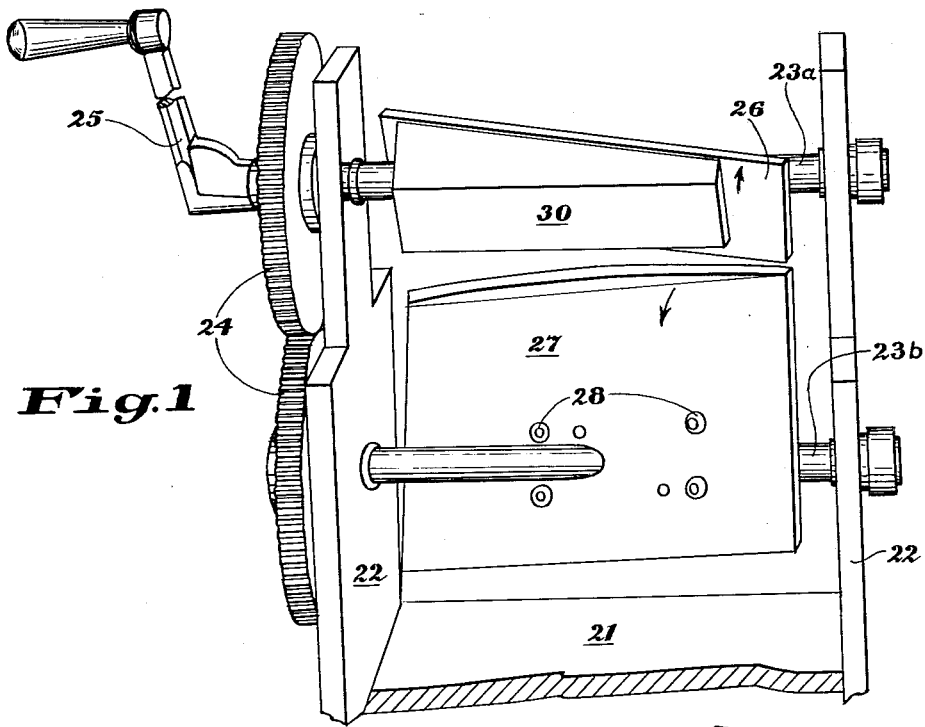
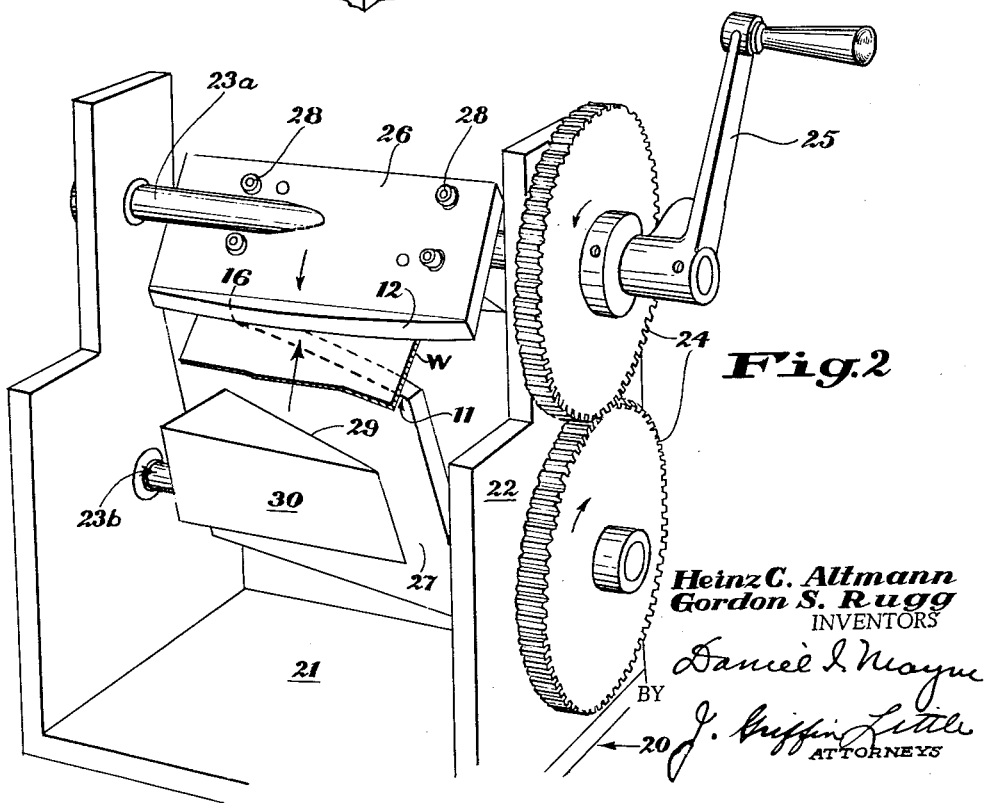
Heinz C. Altmann
Gordon S. Rugg
INVENTORS

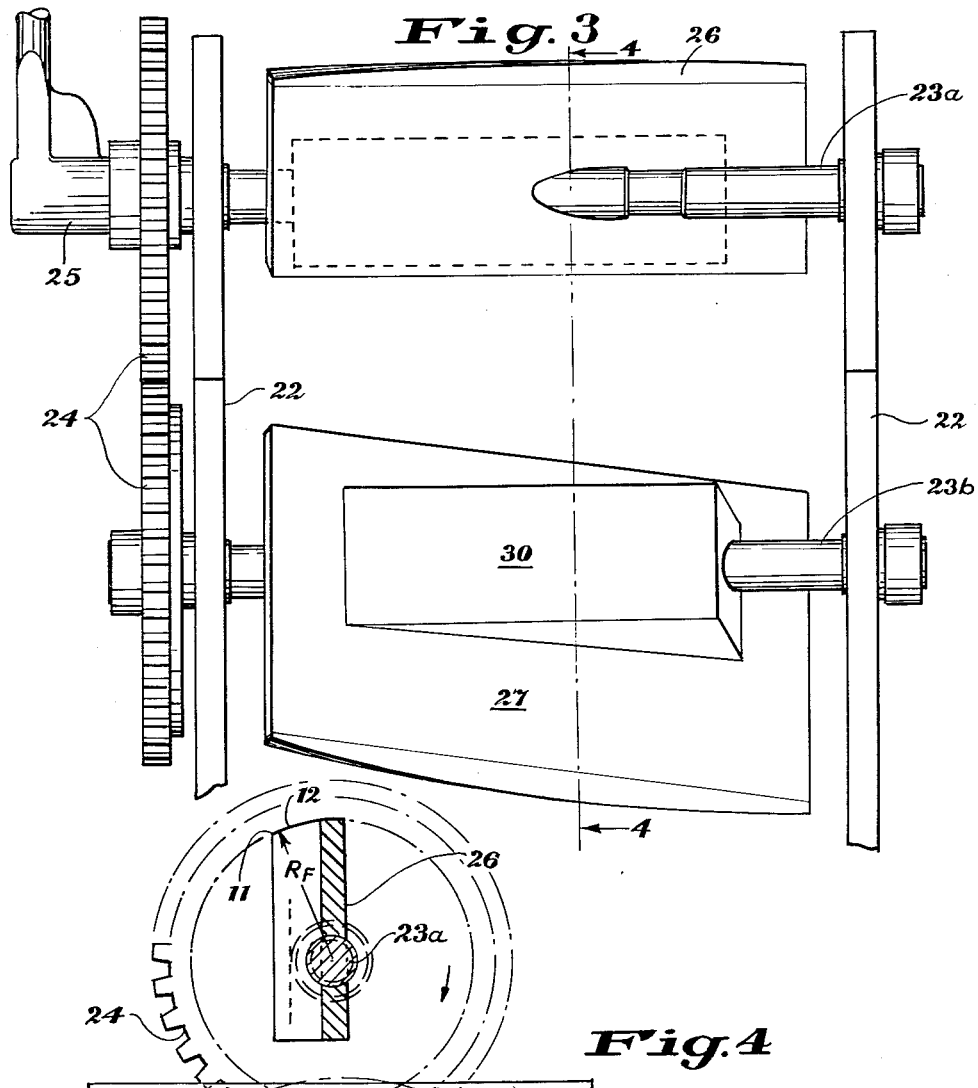
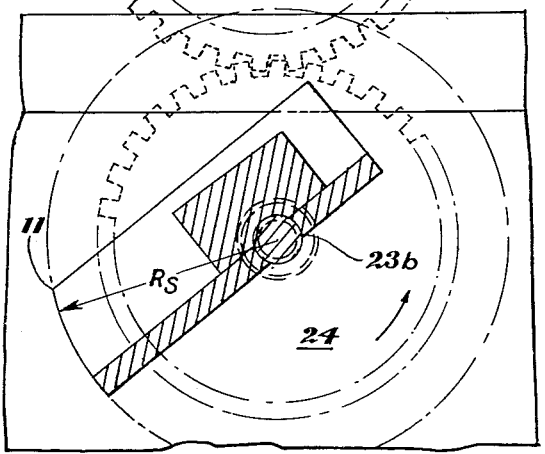

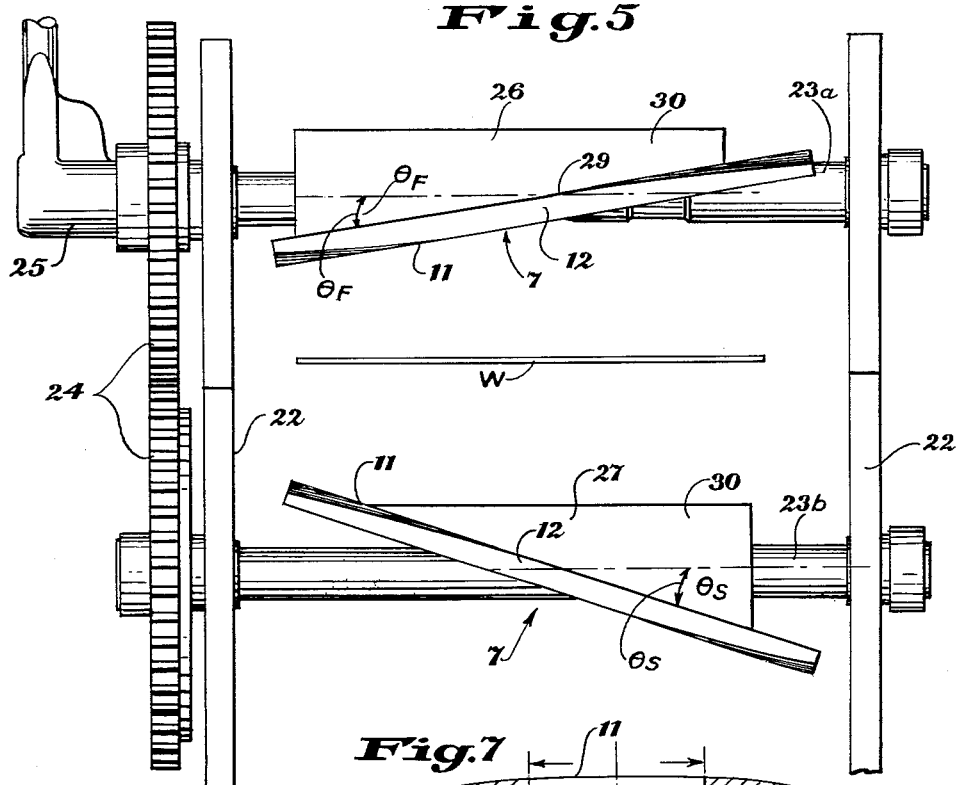
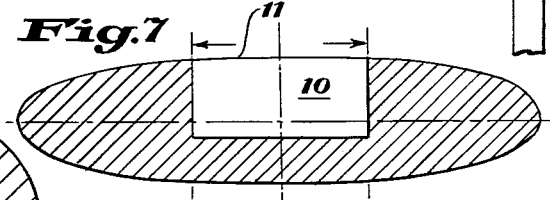
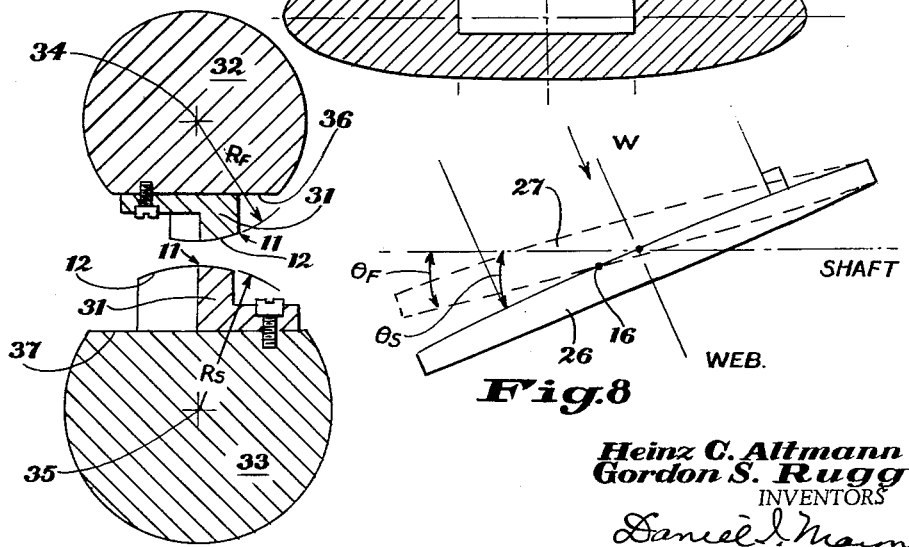

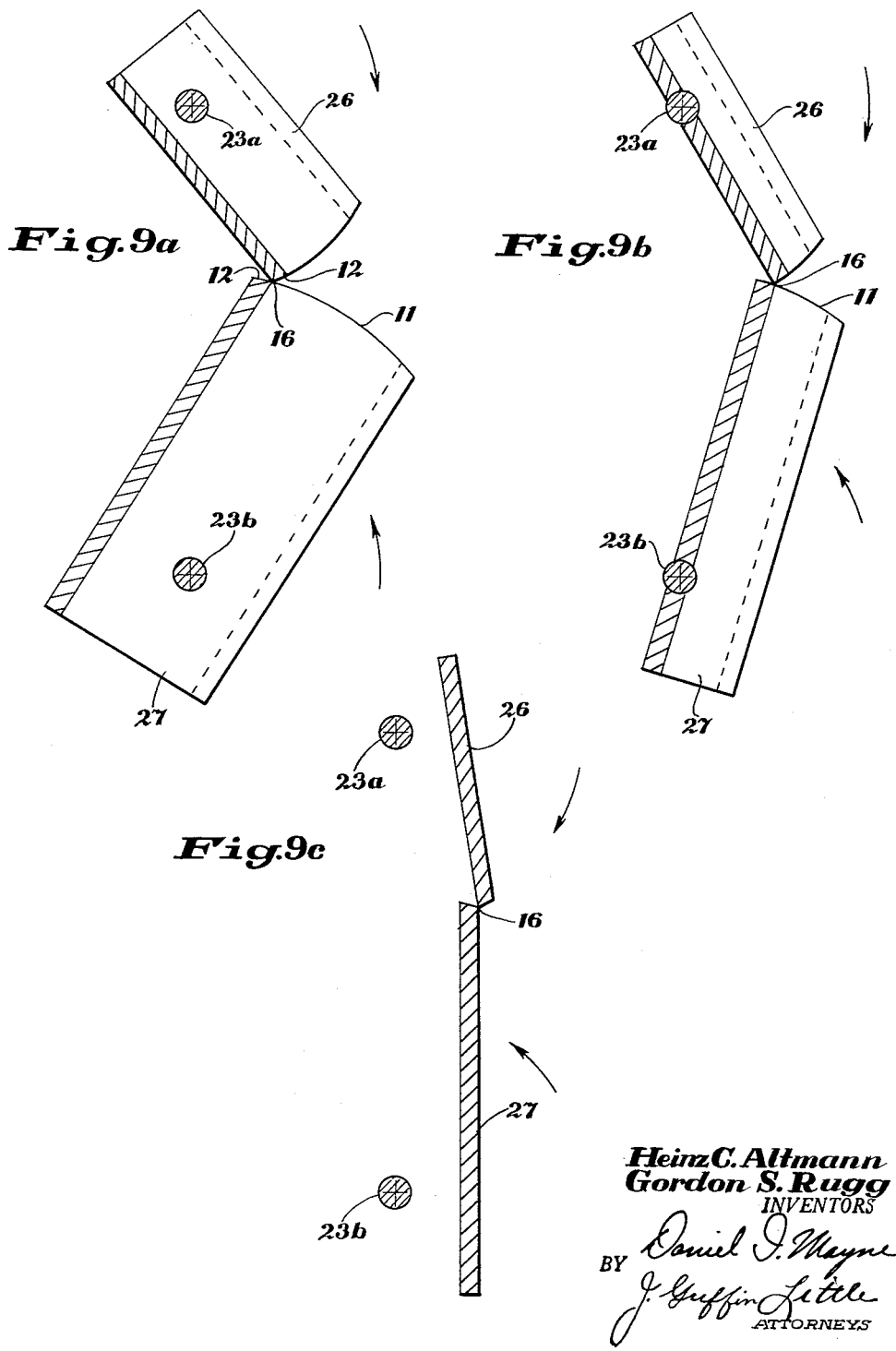

United States Patent Office 3,000,250
Patented Sept. 19, 1961

3,000,250
ROTARY CUTTER FOR PRODUCING A PROGRESSIVE TRANSVERSE CUT ON A WEB
Heinz C. Altmann and Gordon S. Rugg, Rochester, N.Y., assignors to Eastman Kodak Company, Rochester, N.Y., a corporation of New Jersey
Filed Feb. 25, 1957, Ser. No. 642,177
3 Claims. (Cl. 83—341)

The present invention relates to rotary blade choppers, and more particularly to a straight blade chopper.

The principal object of the invention is the provision of a new and improved rotary blade chopper.

Still another object of the invention is the provision of a rotary chopper with a pair of cooperating cutting edges each of which is formed by a plane and a cylinder surface.

Another object of the invention is the provision of a chopper blade, the cutting edge of which is a portion of an ellipse.

Yet another object of the invention is the provision of a rotary chopper provided with cooperating cutting edges which have a natural clearance between the knives.

Still another object of the invention is the provision of a rotary chopper the blades of which exhibit the crossover angle required for clean cutting, and are both rigidly mounted without the use of springs or other elastic members to allow movement of the knife blade relative to its shaft.

To these and other ends the invention resides in certain improvements and combinations of parts, all as will be hereinafter more fully described, the novel features being pointed out in the claims at the end of the specification.

In the drawings:

FIG. 1 is a front elevation view of a chopper of the present invention showing the general relation of the cutting blades or edges;

FIG. 2 is a side perspective view of the chopper illustrated in FIG. 1 showing the relation of the cutting edges during cutting or severing operation;

FIG. 3 is a plan view of the chopper showing one method of mounting the cutting edges;

FIG. 4 is a sectional view showing the sizes and relations of the cutting blades and taken substantially on line 4—4 of FIG. 3;

FIG. 5 is a straight front view of the chopper with the blades arranged in edge relation to show the angular relation of the blades to one another and to the supporting shafts. To show this relation the blades are moved out of their normal relation, FIG. 4, so both blades can be viewed edgewise;

FIG. 6 is a modified blade arrangement and mounting means therefor, the cutting edges being abnormally spaced and moved angularly from their normal relation to show more clearly the mounting means;

FIG. 7 shows a basic type of elliptical cutting edge as viewed in the direction of the arrows, FIG. 5;

FIG. 8 is a diagrammatic plan view of the knife edges and the web showing the relation thereof during the cutting operation; and FIGS. 9a–9c are schematic cross section views showing the cutting action between the two blades during a cutting cycle. FIG. 9a shows the coaction of the blades at the beginning of the cutting cycle, FIG. 9b the coaction of the blades in the middle of a cutting cycle, and FIG. 9c the coaction of the blades at the end of a cutting cycle.

Similar reference numerals throughout the various views indicate the same parts.

The straight blade chopper of the present invention is used to chop and sever a web W in selective lengths as the web passes through a chopper, as illustrated in FIGS. 2 and 8. In the chopper construction, blades with cutting edges generally formed by plane and cylindrical grinding are used, as resharpening grinds can be made simply and economically.

In order to obtain the necessary knife crossover, the plane angles of the knives $\theta_F$ and $\theta_S$, FIG. 5, are not equal. Necessary natural clearance is obtained if the angle difference $\theta_S - \theta_F$ is larger than the certain small minimum which can be calculated. A straight planar cutting edge is generated when a cylinder is cut by a plane so the edge of the cylinder is an ellipse, as illustrated in FIG. 7. From a practical point, a straight planar cutting edge can be made simply by generating a radius and a flat on the plate which is then mounted as shown in FIG. 5. Providing the angle between the cylinder and the cutting plane is small, the resulting cutting edge nearly matches the cut made by a blade with a helical cutting edge over a considerable length. The wider the web to be chopped the smaller must be this angle for a given deviation from the ideal straight line cut. A helical blade forms a straight cut across the web, while the straight blade of the present invention provides a cut which is slightly sinusoidal in shape but for all practical purposes the cut is a straight cut over the portion used. However, a straight blade, as adapted for use in the rotary chopper, needs to have a natural clearance since the blade cutting edge has an elliptical shape, and grinding an angle or rake to provide clearance for the other edge during cutting is impractical. Interference will not occur and, therefore, no such clearance angle is required, if the angle difference $\theta_S - \theta_F$ is made larger than a critical minimum which can be calculated.

FIG. 7 shows the shape of a surface 10 which is formed when a plane is passed through a cylinder at a small angle to the cylinder axis. It is also noted that one of the edges 11 of this elliptical surface forms the cutting edge of the blade of the present invention. As mentioned above, this type of edge can be formed by grinding a radius and flat on a plate of the chopper shown in FIGS. 1–5.

In addition to the cutting edge 11 being elliptical, the heel or surface 12 is a part of the cylindrical surface as indicated in FIGS. 1–5. Only the central portion of the elliptical surface 10, which closely approaches a helix, is used. The unused portion of surface 10 is shown in the section lines, FIG. 7.

In the embodiment illustrated in FIG. 2 of the drawings, a suitable support 20 is provided for the pair of straight cutting blades. This support comprises a base 21 and a pair of spaced side plates 22 extending upward from the base 21, as shown in FIG. 1. The plates 22 have journaled therein a pair of spaced parallel arbors or shafts 23a and 23b having one end of each shaft extending beyond one of the plates 22 and having mounted thereon two gears 24 meshing with each other. The gears 24, of equal diameter, when rotated will turn the two shafts 23a and 23b at equal angular speed but in different directions, as is apparent. A suitable handle 25, or other operating device, may be connected to one of the gears to impart rotation to both gears and hence to the shafts 23a and 23b. The rotated blades of FIGS. 1–5 are identical in shape to the solid area shown in FIG. 7, and corresponding parts will be designated by the same numerals. As only this area is used, each blade is provided with a single cutting edge 11, as is deemed apparent from the drawings. As the blades are of different sizes they will be designated by separate numerals. The upper or smaller blade being designated by the numeral 26, and the lower or larger blade designated by the numeral 27. Each blade 26 or 27 is connected by bolts 28, or other suitable fastening means, to an inclined surface 29 of a wedge-shaped member 30, as clearly illustrated in FIGS. 3 and 5. Each wedge 30 is so mounted on one of the shafts 23a or 23b that the blade is positioned at an angle to its shaft, see FIG. 5. Also, the angular relation of the two blades is different for the reasons stated above. Furthermore, the blades are oppositely arranged or inclined as shown in FIG. 5. Thus, each blade is mounted at an angle to its supporting shaft and the angular relation of the two blades is different, the lower or larger blade being at a slightly greater angle to its shaft than the upper or smaller blade.

The difference between angles $\theta_S$ and $\theta_F$ is the crossover angle by which the web is being cut at 16. This angle is necessary if the cut is to be a clean shear cut. If both blades were at the same (cylinder) radius, one of the knives would have to be mounted elastically with respect to its shaft to allow for the accumulation of angular motion between that knife and its shaft during cutting. This is undesirable because at the very end of the cutting operation, this accumulation of angular motion would suddenly be released; and, when the knives separated, the elastic member would impact the knife to carry the member against the stop (which may be part of the shaft member) with considerable force and corresponding noise and wear.

Proportioning the radii of two knives together with their angles by means of calculation, in such a way that no spring mounting is necessary, both knives may be mounted rigidly on their shafts. This results in the chopper as illustrated where the top knife has a smaller angle and a smaller (cylinder) radius than the bottom knife. If the cut is to be perpendicular to the web edge, the web has to be fed to the chopper in a direction perpendicular to the plane given by the angle $\theta_F$, if the plane of the small knife is rotated perpendicular to the web, as indicated in FIG. 8.

The blades of the present invention thus (1) are oppositely inclined; (2) are of different diameters; (3) are angularly arranged; (4) at different angular relation to the shafts, and (5) rotate at equal angular speed but in opposite directions, all of which is shown in the drawings. By means of this arrangement, a sinusoidal cut approaching a straight cut is formed across the web and natural clearance is provided between the cutting blades without the necessity of grinding such clearance. Furthermore, the proposed blade structure eliminates the necessity for spring mounting one or more of the blades as is common practice. Also, by reason of the gears 24, both shafts, and hence the cutting edges 11, are driven in opposite directions at equal angular speeds to provide the desired cutting. FIG. 6 shows a slightly modified arrangement in which a smaller part of the solid line structure, FIG. 7, is used. In this arrangement only a small portion of the blade adjacent the cutting edge is used to provide what may be termed "a bar" 31 having an elliptical cutting edge 11 formed thereon. The shafts 23a and 23b and the wedges 30 of FIGS. 1-5, are replaced by solid cylinder arbors 32 and 33, which are rotatable in opposite directions by any suitable means about their axes 34 and 35. The cylinders or arbors 32 and 33 are provided with flattened or chordal areas 36 and 37, as clearly illustrated in FIG. 6. The diameters of the two bar blades are substantially the same as the blade arrangements of FIGS. 1-5. The blade bars of FIG. 6 are positioned in oppositely inclined relation on the areas 36 and 37 and in different angular relation to the axes of arbors 32 and 33. Thus, in this embodiment as in that of FIGS 1-5, the cutting edges 11 are at different radial distances from the axes of rotation; are in angularly arranged relation, at different angles, to the axes of rotation, the blades are straight and the cutting edges elliptical, and the edges 11 have natural clearance during cutting.

FIG. 8 is a diagrammatic arrangement of blades and webs showing the relation of the blades and web during the cutting operation, the actual cutting being performed at point 16. FIGS 9a-9c are sectional vertical views taken normal to the shafts 23a and 23b and showing the cutting action between the two coacting blades 26 and 27 during one cutting cycle. FIG. 9a is a section taken adjacent one end of the blades where they first meet and it will be noticed that the initial point of meeting is substantially to the right of the vertical which would join the shafts 23a and 23b on which the knives are mounted in inclined relation. FIG. 9b is a section taken at substantially the middle of the cut, or when the blades intersect the shafts 23a and 23b and at the midpoint of the length of the cutting edges as evidenced by the fact that only about one-half the overall length of each blade is visible. FIG. 9c is a section taken at the other ends of the blades, as evidenced by the fact that no remaining blade length is visible, and shows the coaction at the end of a cutting cycle.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What we claim and desire to secure by Letters Patent of the United States is:

1. A rotary chopper comprising in combination, a pair of parallel rotatable arbors mounted to be rotated in opposite directions; a pair of planar knife blades each having an axially elliptical cutting edge of substantially equal length, one of said elliptical cutting edges being formed by the intersection of a cylindrical knife heel concentric to the axis of rotation of one of said arbors with a planar knife face, and the other of said elliptical cutting edges being formed by the intersection of a cylindrical knife heel concentric to the axis of rotation of the other of said arbors with a planar knife face, and the radii of the two said cylindrical knife heels being unequal; means for rigidly mounting each of said knife blades on opposite ones of said arbors so that the said knife heels will be substantially concentric to the respective arbors upon which they are mounted and so that the cutting edges of said knife blades will meet in continuous point shearing contact throughout a phase of the revolution of said blades, said mounting means being such that each blade is mounted with its planar knife face in inclined relation to its respective arbor by a different angular amount, and with the blade having the larger knife heel radius being mounted at the larger angle of inclination to its arbor, and with the direction of inclination of the two planar knife faces being the same during the phase of revolution of said knife blades when said elliptical cutting edges are in shearing contact; and means for rotating said arbors in opposite directions at the same angular velocity so that the elliptical cutting edge of the knife blade having the larger radius of revolution leads the elliptical cutting edge of the knife blade having the smaller radius of revolution during the shearing action.

2. A rotary chopper according to claim 1 in which the means for rigidly mounting each of said knife blades on its respective arbor comprises a blade support member fixed to the arbor and having a planar supporting surface intersecting said arbor at an angle corresponding to the angle of inclination defined for the blade it is to support; a planar supporting surface on the knife blade parallel to the planar knife face; and means for detachably connecting said knife blade on said support member with the planar supporting surface of the blade in surface contact with the planar supporting surface of said support member.

3. A rotary chopper according to claim 1, in which the means for rigidly mounting each of said knife blades on its respective arbor comprises a flat surface extending axially of the periphery of said arbor a distance substantially equal to the length of the blade and defining a chord of said arbor; a flat supporting surface on the knife blade extending substantially at right angles to, and the full length of, the planar face of said blade; and means for detachably mounting the knife blade on said arbor with said flat supporting surface of the blade in surface contact with the flat surface on the arbor and with the planar knife face having the prescribed angle of inclination with the axis of its arbor.

References Cited in the file of this patent

UNITED STATES PATENTS

| | | |
|---|---|---|
| 709,408 | Johnz | Sept. 16, 1902 |
| 1,318,892 | Maier | Oct. 14, 1919 |
| 2,478,240 | Christman | Aug. 9, 1949 |